United States Patent
Mizutani et al.

(10) Patent No.: US 10,895,553 B2
(45) Date of Patent: Jan. 19, 2021

(54) GAS SENSOR

(71) Applicant: DENSO CORPORATION, Kariya (JP)

(72) Inventors: Keisuke Mizutani, Nisshan (JP); Keigo Mizutani, Nisshan (JP); Mitsunobu Nakato, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 16/098,543

(22) PCT Filed: Apr. 19, 2017

(86) PCT No.: PCT/JP2017/015790
§ 371 (c)(1),
(2) Date: Nov. 2, 2018

(87) PCT Pub. No.: WO2017/195556
PCT Pub. Date: Nov. 16, 2017

(65) Prior Publication Data
US 2019/0383768 A1    Dec. 19, 2019

(30) Foreign Application Priority Data

May 11, 2016 (JP) ................................. 2016-095557

(51) Int. Cl.
*G01N 27/419* (2006.01)
*G01N 27/409* (2006.01)
(52) U.S. Cl.
CPC ......... *G01N 27/419* (2013.01); *G01N 27/409* (2013.01)
(58) Field of Classification Search
CPC ........................... G01N 27/409; G01N 27/419
See application file for complete search history.

(56) References Cited

U.S. PATENT DOCUMENTS 5,672,811 A * 9/1997 Kato .................. G01N 27/4074
204/425
5,763,763 A * 6/1998 Kato .................. G01N 27/4074
204/412

(Continued)

FOREIGN PATENT DOCUMENTS

JP    H10-253585    9/1998
JP    2003-166973   6/2003

(Continued)

OTHER PUBLICATIONS

English translation of Written Statement submitted to the JPO for Application No. PCT/JP2017/015790 (6 pages).

*Primary Examiner* — David J Bolduc
(74) *Attorney, Agent, or Firm* — Nixon & Vanderhye PC

(57) ABSTRACT

Provided is a gas sensor improving accuracy of detection of specific gas in measurement gas, while maintaining high responsiveness in detection of the specific gas. A sensor element of a gas sensor includes a first solid electrolyte and second solid electrolyte having oxygen ionic conductivity, a measurement gas chamber into which measurement gas is introduced, a first reference gas chamber and second reference gas chamber into which reference gas is introduced, a first pump cell, a second pump cell, a sensor cell, and a heater. The sensor cell detects a specific gas component in the measurement gas having an oxygen concentration adjusted by the pump cells. The heater is located opposite to a second principal surface of the second solid electrolyte on which the sensor cell is formed.

5 Claims, 17 Drawing Sheets

(56) References Cited

U.S. PATENT DOCUMENTS

| | | | |
|---|---|---|---|
| 6,068,747 A | 5/2000 | Tojo et al. | |
| 6,156,176 A * | 12/2000 | Sugiyama | G01N 27/419 204/425 |
| 6,401,522 B1 * | 6/2002 | Kon | G01N 27/419 204/424 |
| 6,471,840 B1 * | 10/2002 | Gao | G01N 27/4175 204/425 |
| 6,554,983 B2 * | 4/2003 | Imamura | G01N 27/419 204/425 |
| 2002/0050455 A1 * | 5/2002 | Kurokawa | G01N 27/4175 204/431 |
| 2002/0104758 A1 | 8/2002 | Mizutani et al. | |
| 2002/0162755 A1 * | 11/2002 | Kato | G01N 27/417 205/781 |
| 2002/0166765 A1 * | 11/2002 | Lenfers | G01N 27/419 204/424 |
| 2002/0175077 A1 * | 11/2002 | Wahl | G01N 27/419 204/424 |
| 2002/0189942 A1 * | 12/2002 | Niwa | G01N 27/419 204/424 |
| 2002/0195338 A1 * | 12/2002 | Mizutani | G01N 27/419 204/426 |
| 2004/0069630 A1 * | 4/2004 | Tanaka | G01N 27/419 204/424 |
| 2004/0074773 A1 * | 4/2004 | Niwa | G01N 27/419 204/425 |
| 2005/0067282 A1 * | 3/2005 | Cramer | G01N 27/419 204/424 |
| 2007/0125647 A1 * | 6/2007 | Wang | H01M 8/0618 204/400 |
| 2010/0101303 A1 * | 4/2010 | Sasaki | G01N 27/4067 73/23.32 |
| 2010/0140113 A1 * | 6/2010 | Teramoto | G01N 27/419 205/782 |
| 2011/0147214 A1 | 6/2011 | Fujita et al. | |
| 2011/0168574 A1 * | 7/2011 | Sasaki | G01N 27/4071 205/775 |
| 2012/0199478 A1 * | 8/2012 | Sasaki | G01N 27/4065 204/406 |
| 2013/0019655 A1 * | 1/2013 | Nakagawa | G01N 27/419 73/31.05 |
| 2013/0092537 A1 | 4/2013 | Mizutani et al. | |
| 2013/0122441 A1 * | 5/2013 | Nakagaki | G01N 27/4075 432/9 |
| 2015/0268192 A1 * | 9/2015 | Saito | G01N 27/4067 205/793 |
| 2015/0293053 A1 * | 10/2015 | Akiyama | G01N 27/419 204/408 |
| 2015/0323493 A1 * | 11/2015 | Uemura | F02D 41/28 204/406 |
| 2016/0061768 A1 * | 3/2016 | Nakasone | G01N 27/419 204/412 |
| 2016/0209353 A1 * | 7/2016 | Aoki | G01N 27/4067 |
| 2016/0209354 A1 * | 7/2016 | Araki | G01N 27/419 |
| 2017/0010236 A1 * | 1/2017 | Sakashita | F01N 11/002 |
| 2017/0219516 A1 * | 8/2017 | Toudou | G01N 27/4067 |
| 2017/0219517 A1 * | 8/2017 | Uematsu | G01N 27/4067 |
| 2018/0074009 A1 * | 3/2018 | Okamoto | G01N 33/0054 |
| 2018/0094564 A1 * | 4/2018 | Okamoto | G01N 27/419 |
| 2018/0100828 A1 * | 4/2018 | Okamoto | G01N 27/419 |
| 2019/0094177 A1 * | 3/2019 | Higuchi | G01N 27/4065 |
| 2019/0145925 A1 * | 5/2019 | Fujii | G01N 27/419 204/424 |
| 2019/0277796 A1 * | 9/2019 | Kamada | G01N 27/41 |
| 2019/0383765 A1 * | 12/2019 | Okamoto | G01N 27/419 |
| 2019/0383767 A1 * | 12/2019 | Nakagaki | G01N 27/4071 |

FOREIGN PATENT DOCUMENTS

| | | |
|---|---|---|
| JP | 2011-043523 | 3/2011 |
| JP | 2014-209128 | 11/2014 |

* cited by examiner

<TEST ITEM 1>

<TEST ITEM 2>

GAS SENSOR

CROSS-REFERENCE TO RELATED APPLICATIONS

This application is the U.S. national phase of International Application No. PCT/JP2017/015780 flied Apr. 19, 2017 which designated the U.S. and claims priority to Japanese Patent Application No. 2016-095557 filed May 11, 2016, the entire contents of each of which are incorporated herein by reference.

TECHNICAL FIELD

The present disclosure relates to a gas sensor which measures a concentration of a specific gas component in measurement gas.

BACKGROUND ART

An exhaust system of an internal combustion engine employs a gas sensor which detects specific gas, such as oxygen and nitrogen oxide, in exhaust gas as measurement gas.

For example, a sensor element of a gas sensor described in Patent Literature 1 includes a first solid electrolyte and a second solid electrolyte which have oxygen ionic conductivity, a measurement gas chamber which is formed between the first solid electrolyte and the second solid electrolyte and into which measurement gas is introduced, and a heater which is located facing the second solid electrolyte. On each of the first solid electrolyte and the second solid electrolyte, a pump cell for adjusting an oxygen concentration in the measurement gas chamber is provided. On the first solid electrolyte, a sensor cell for detecting a specific gas component in the measurement gas is provided downstream from locations of the pump cells in a flow direction of the measurement gas. The sensor cell is activated by being heated by the heater and is used for detecting a specific gas component in the measurement gas in which the oxygen concentration has been adjusted by the pump cells.

CITATION LIST

Patent Literature

[PTL 1] JP 2013-88119 A

SUMMARY OF THE INVENTION

In order to improve accuracy of detection of a specific gas component performed by the sensor cell, a temperature of the sensor cell needs to be maintained in a target temperature range. In particular, when a transient variation occurs in a surrounding temperature of the sensor element, the temperature of the sensor cell fluctuates under the influence of the transient variation of the surrounding temperature. In the sensor element of the gas sensor of Patent Literature 1, the sensor cell is provided not on the second solid electrolyte, which is located adjacent to the heater, but on the first solid electrolyte, which is located away from the heater. Accordingly, the location of the sensor cell is inadequate for heat generated during operation of the heater to be quickly transferred to the sensor cell, and further measures are required to more stably maintain the temperature of the sensor cell in the target temperature range by operation of the heater. Thus, there is more room for improvement in order to improve accuracy of detection of a specific gas component in measurement gas performed by the sensor cell, even when a transient variation occurs in a surrounding temperature of the sensor element.

The present disclosure has an object of providing a gas sensor capable of improving accuracy of detection of a specific gas component in measurement gas, while maintaining high responsiveness in detection of the specific gas component.

Solution to Problem

An aspect of the present disclosure is a gas sensor including a sensor element for measuring a concentration of a specific gas component in measurement gas containing oxygen, wherein the sensor element includes: a measurement gas chamber into which the measurement gas is introduced; a first reference gas chamber and a second reference gas chamber into each of which reference gas is introduced; a first solid electrolyte which has a plate shape, has oxygen ionic conductivity, is located between the first reference gas chamber and the measurement gas chamber, and has a first principal surface facing the first reference gas chamber and a second principal surface facing the measurement gas chamber; a second solid electrolyte which has oxygen ionic conductivity, is located opposite to the first solid electrolyte across the measurement gas chamber, and has a first principal surface facing the measurement gas chamber and a second principal surface facing the second reference gas chamber; a first pump cell which is constituted by a first reference electrode, a first pump electrode, and a part of the first solid electrolyte and adjusts an oxygen concentration in the measurement gas chamber by energization between the first reference electrode and the first pump electrode, the first reference electrode being formed on the first principal surface of the first solid electrolyte, the first pump electrode being formed on the second principal surface of the first solid electrolyte; a second pump cell which is constituted by a second pump electrode, a second reference electrode, and a part of the second solid electrolyte and adjusts the oxygen concentration in the measurement gas chamber by energization between the second reference electrode and the second pump electrode, the second pump electrode being formed on the first principal surface of the second solid electrolyte, the second reference electrode being formed on the second principal surface of the second solid electrolyte; a sensor cell which is constituted by a sensor electrode, a third reference electrode, and a part of the second solid electrolyte and is for detecting, on the basis of an electric current flowing between the third reference electrode and the sensor electrode, a specific gas component in the measurement gas in which the oxygen concentration has been adjusted by the pump cells, the sensor electrode being formed downstream from the second pump cell in a flow direction of the measurement gas on the first principal surface of the second solid electrolyte, the third reference electrode being formed on the second principal surface of the second solid electrolyte; and a heater which is located facing the second principal surface of the second solid electrolyte.

Advantageous Effects of the Invention

The heater of the sensor element of the above gas sensor is located facing the second principal surface of the second solid electrolyte on which the sensor cell is formed. Accordingly, as compared with when the heater is located opposite to the first solid electrolyte on which the sensor cell is not formed, the location of the sensor cell is closer to that of the heater, and thus when the gas sensor is started or used, heat generated during operation of the heater can be more quickly transferred to the sensor cell. This makes it easier to maintain a temperature of the sensor cell in a target temperature range, even when a transient variation occurs in a surrounding temperature of the sensor element. Consequently, fluctuations in the temperature of the sensor cell are suppressed, and this improves accuracy of detection of a specific gas component in measurement gas performed by the sensor cell.

Since the pump cells are separated as the first pump cell and the second pump cell, a length of each of the pump cells in the flow direction is short. Accordingly, only a short time is required for the measurement gas in which the oxygen concentration has been adjusted by the pump cells to reach the sensor electrode of the sensor cell. Thus, high responsiveness is maintained in detection of a specific gas component in the measurement gas.

As has been described, the above gas sensor improves accuracy of detection of a specific gas component in measurement gas, while maintaining high responsiveness in detection of the specific gas component.

BRIEF DESCRIPTION OF THE DRAWINGS

The above object and other objects, features, and advantages of the present disclosure will be clarified by the following detailed description with reference to the accompanying drawings, wherein.

DESCRIPTION OF THE EMBODIMENTS

Embodiment 1

With reference to FIGS. 1 to 9, a description will be given of an embodiment of the gas sensor mentioned above.

Figure 1:
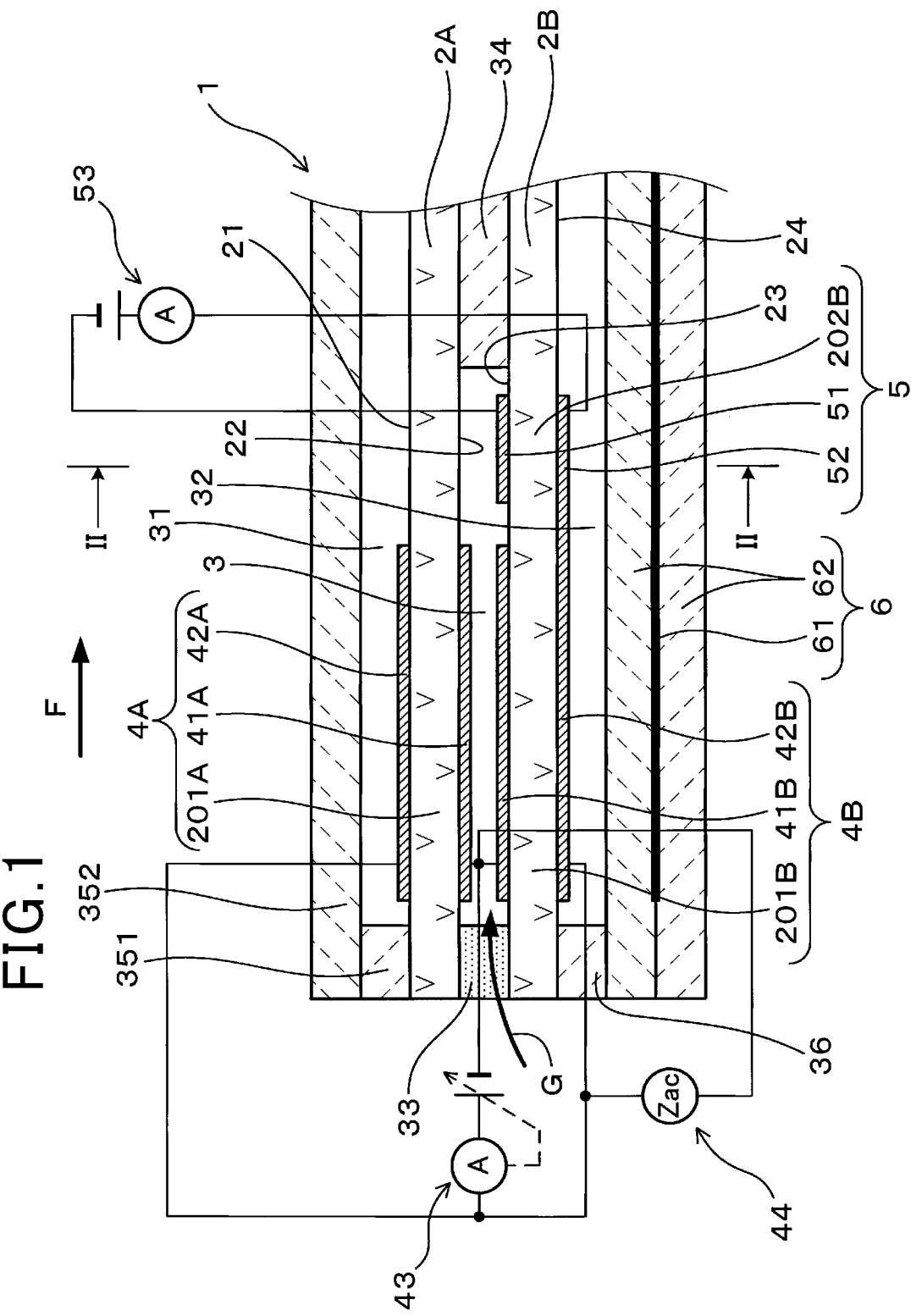
FIG. 1 is an explanatory view illustrating a cross section of a sensor element of Embodiment 1.
Figure 2:
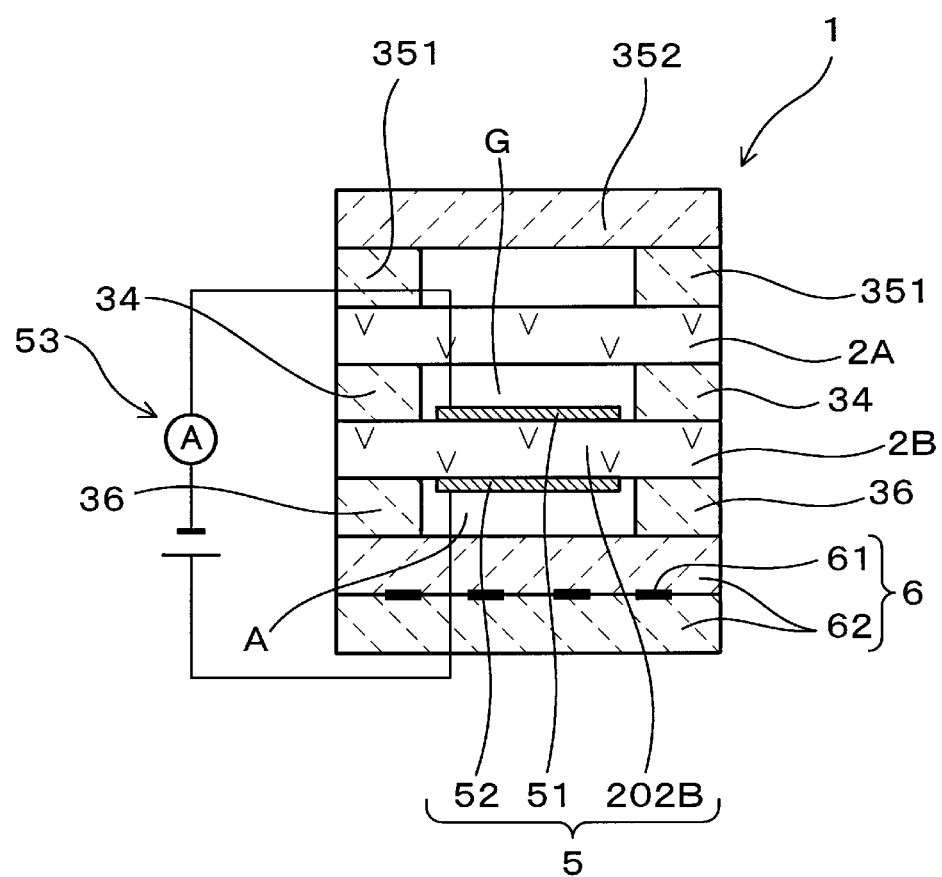
FIG. 2 is a cross-sectional view taken along line II-II viewed from the direction of arrows in FIG. 1.

A gas sensor 10 of the present embodiment includes a sensor element 1 for measuring a concentration of a specific gas component in measurement gas G containing oxygen. As illustrated in FIGS. 1 and 2, the sensor element 1 includes a first solid electrolyte 2A and a second solid electrolyte 2B which have oxygen ionic conductivity, a measurement gas chamber 3 into which measurement gas G is introduced, a first reference gas chamber 31 and a second reference gas chamber 32 into each of which reference gas A is introduced, a first pump cell 4A, a second pump cell 4B, a sensor cell 5, and a heater 6. The first solid electrolyte 2A is located between the first reference gas chamber 31 and the measurement gas chamber 3. The first solid electrolyte 2A has a first principal surface 21 facing the first reference gas chamber 31 and a second principal surface 22 facing the measurement gas chamber 3. The second solid electrolyte 2B is located opposite to the first solid electrolyte 2A across the measurement gas chamber 3. The second solid electrolyte 2B has a first principal surface 23 facing the measurement gas chamber 3 and a second principal surface 24 facing the second reference gas chamber 32.

As illustrated in FIG. 1, the first pump cell 4A is constituted by a first reference electrode 42A formed on the first principal surface 21 of the first solid electrolyte 2A, a first pump electrode 41A formed on the second principal surface 22 of the first solid electrolyte 2A, and a part 201A of the first solid electrolyte 2A interposed between the first reference electrode 42A and the first pump electrode 41A. The first pump cell 4A is used for adjusting an oxygen concentration in the measurement gas chamber 3 by energization between the first reference electrode 42A and the first pump electrode 41A.

The second pump cell 4B is constituted by a second pump electrode 41B formed, at a position opposite to the first pump electrode 41A, on the first principal surface 23 of the second solid electrolyte 2B, a second reference electrode 42B formed on the second principal surface 24 of the second solid electrolyte 2B, and a part 201B of the second solid electrolyte 2B interposed between the second pump electrode 41B and the second reference electrode 42B. The second pump cell 4B is used for adjusting the oxygen concentration in the measurement gas chamber 3 by energization between the second reference electrode 42B and the second pump electrode 41B.

As illustrated in FIGS. 1 and 2, the sensor cell 5 is constituted by a sensor electrode 51 formed downstream from the second pump cell 4B in a flow direction F of the measurement gas G on the first principal surface 23 of the second solid electrolyte 2B, a third reference electrode 52 formed on the second principal surface 24 of the second solid electrolyte 2B, and a part 202B of the second solid electrolyte 2B interposed between the sensor electrode 51 and the third reference electrode 52. The sensor cell 5 is used for detecting, on the basis of an electric current flowing between the third reference electrode 52 and the sensor electrode 51, a specific gas component in the measurement gas G in which the oxygen concentration has been adjusted by the pump cells 4A and 4B. The heater 6 is located facing the second principal surface 24 of the second solid electrolyte 2B.

A more detailed description will be given of the gas sensor 10 of the present embodiment.

The gas sensor 10 is provided for use in an exhaust passage of an internal combustion engine of a vehicle and detects a concentration of NOx (nitrogen oxide) as specific gas contained in exhaust gas flowing through the exhaust passage, when the measurement gas G is the exhaust gas and the reference gas A is air.

Figure 5:
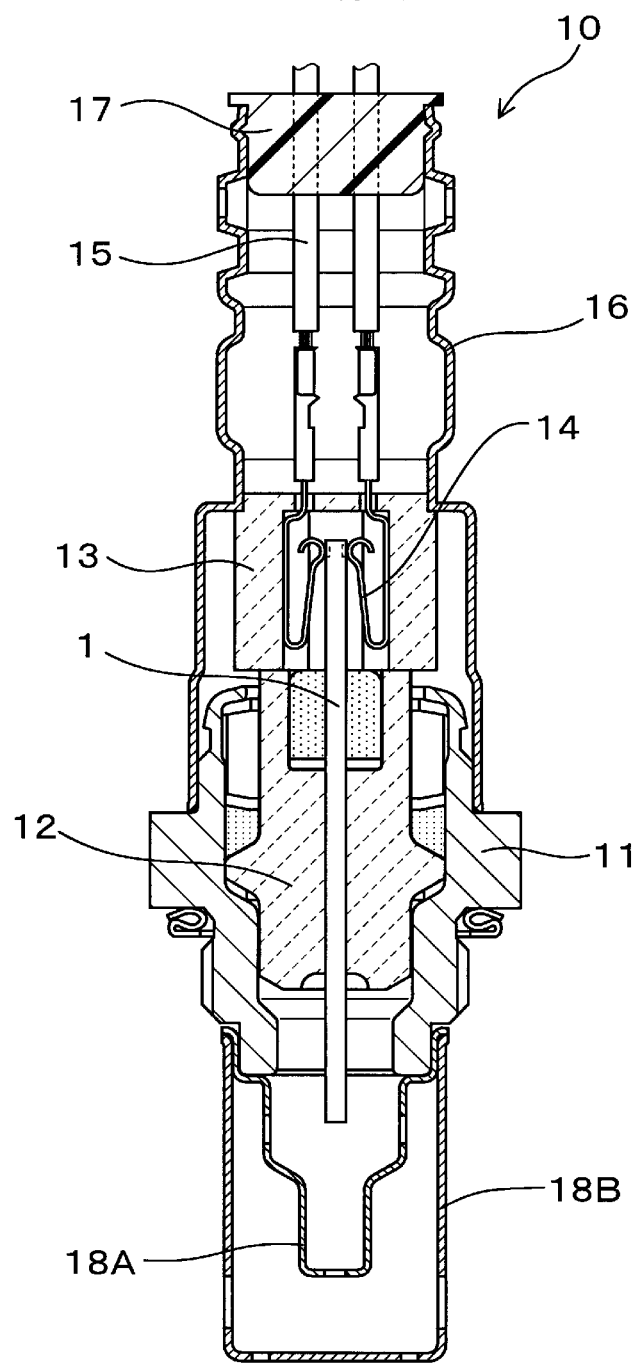
FIG. 5 is a cross-sectional view of a gas sensor including the sensor element of Embodiment 1.

As illustrated in FIG. 5, the gas sensor 10 includes the sensor element 1, a housing 11, insulators 12 and 13, a contact terminal 14, a lead wire 15, a cover 16, a bush 17, double covers 18A and 18B, and the like.

The sensor element 1 is held by the insulator 12, which is held by the housing 11. The gas sensor 10 is attached to the exhaust passage with the housing 11, and the sensor element 1 is located in the exhaust passage. The double covers 18A and 18B which cover a tip end of the sensor element 1 are attached to the housing 11.

On a base end side of the insulator 12, another insulator, i.e., the insulator 13 which holds the contact terminal 14 is located. A lead section of each of the electrodes 41A, 41B, 42A, 42B, 51, and 52 and a lead section of a heating element 61 (which are described later) are drawn to a base end of the sensor element 1 and are connected to the contact terminal 14. The lead wire 15 connected to the contact terminal 14 is held by the bush 17 inside the cover 16 attached on a base end side of the housing 11.

Figure 4:
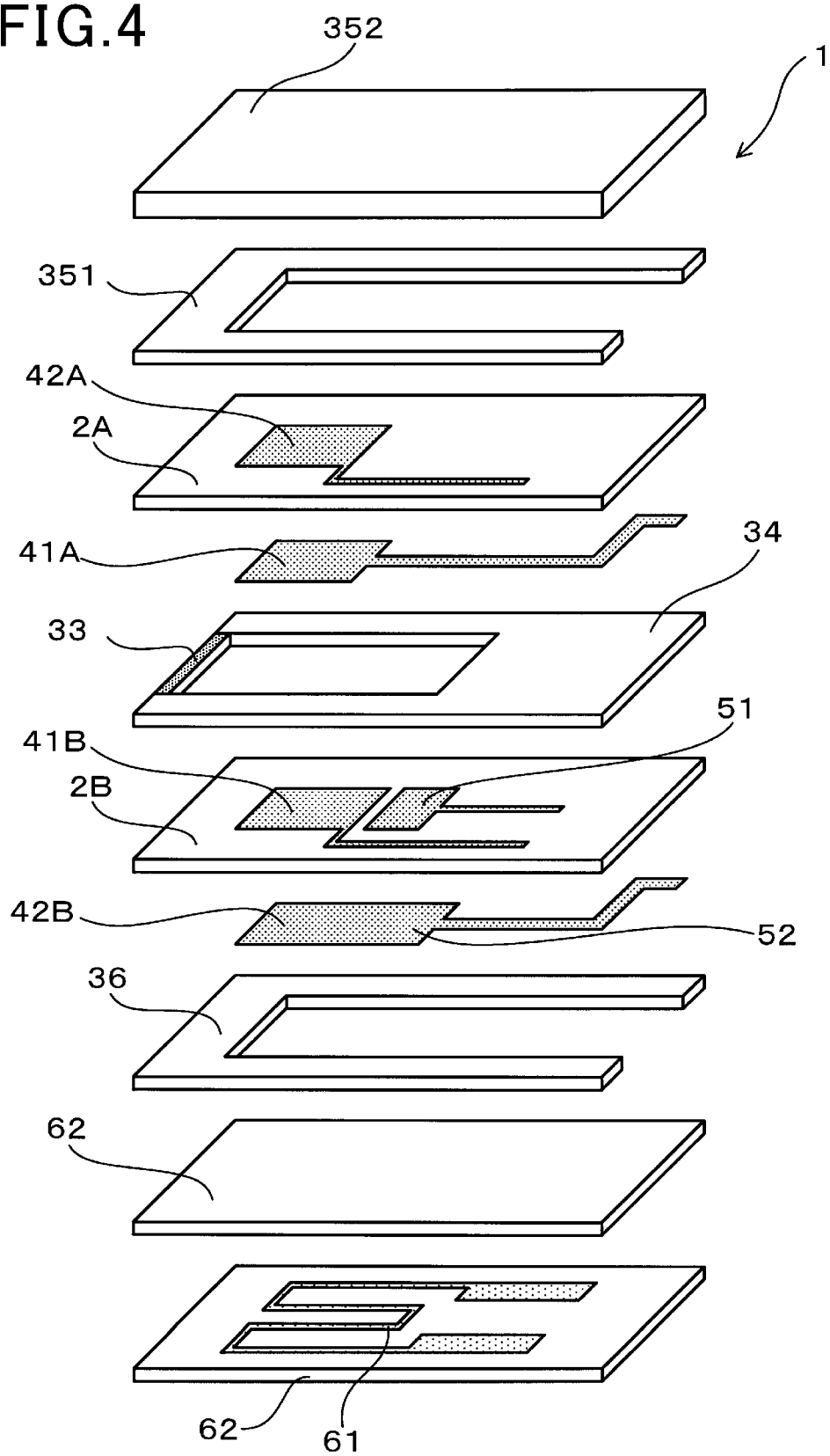
FIG. 4 is an exploded perspective view of the sensor element of Embodiment 1.

As illustrated in FIGS. 1 and 4, the solid electrolytes 2A and 2B are made of plate-shaped yttria stabilized zirconia. The measurement gas chamber 3 is interposed between the second principal surface 22 of the first solid electrolyte 2A and the first principal surface 23 of the second solid electrolyte 2B, and the pump electrodes 41A and 41B and the sensor electrode 51 are located in the measurement gas chamber 3. The measurement gas chamber 3 is surrounded by a diffusion resistance layer 33 through which the measurement gas G passes at a predetermined diffusion rate and an insulation material 34 made of ceramics such as alumina. The diffusion resistance layer 33 is made of porous ceramics. The measurement gas G passes through the diffusion resistance layer 33 and is introduced into the measurement gas chamber 3. The insulation material 34 has a notch for forming the measurement gas chamber 3.

The first reference gas chamber 31 into which the reference gas A is introduced is formed adjacent to the first principal surface 21 of the first solid electrolyte 2A, and the first reference electrode 42A on the first solid electrolyte 2A is located in the first reference gas chamber 31. The first reference gas chamber 31 is surrounded by insulation materials 351 and 352 made of ceramics such as alumina. The insulation material 351 has a notch for forming the first reference gas chamber 31.

The second reference gas chamber 32 into which the reference gas A is introduced is formed adjacent to the second principal surface 24 of the second solid electrolyte 2B, and the second reference electrode 42B and the third reference electrode 52 on the second solid electrolyte 2B are located in the second reference gas chamber 32. The second reference gas chamber 32 is surrounded by the heater 6 and an insulation material 36 made of ceramics such as alumina. The insulation material 36 has a notch for forming the second reference gas chamber 32.

As illustrated in FIG. 1, a voltage application circuit 43 is connected to the first pump cell 4A and the second pump cell 4B. The voltage application circuit 43 applies a voltage between the first pump electrode 41A and the first reference electrode 42A and between the second pump electrode 41B and the second reference electrode 42B. The voltage application circuit 43 is provided in a control unit (SCU) of the gas sensor 10. The SCU is operated by commands from a control unit (ECU) of the internal combustion engine. When the voltage application circuit 43 applies a voltage between the pump electrode 41A and the reference electrode 42A and between the pump electrode 41B and the reference electrode 42B, oxygen in the measurement gas G which comes into contact with the pump electrodes 41A and 41B is decomposed and oxygen ions are transmitted to the reference electrodes 42A and 42B through the solid electrolytes 2A and 2B, respectively, so that the oxygen in the measurement gas G in the measurement gas chamber 3 is removed.

Figure 6:
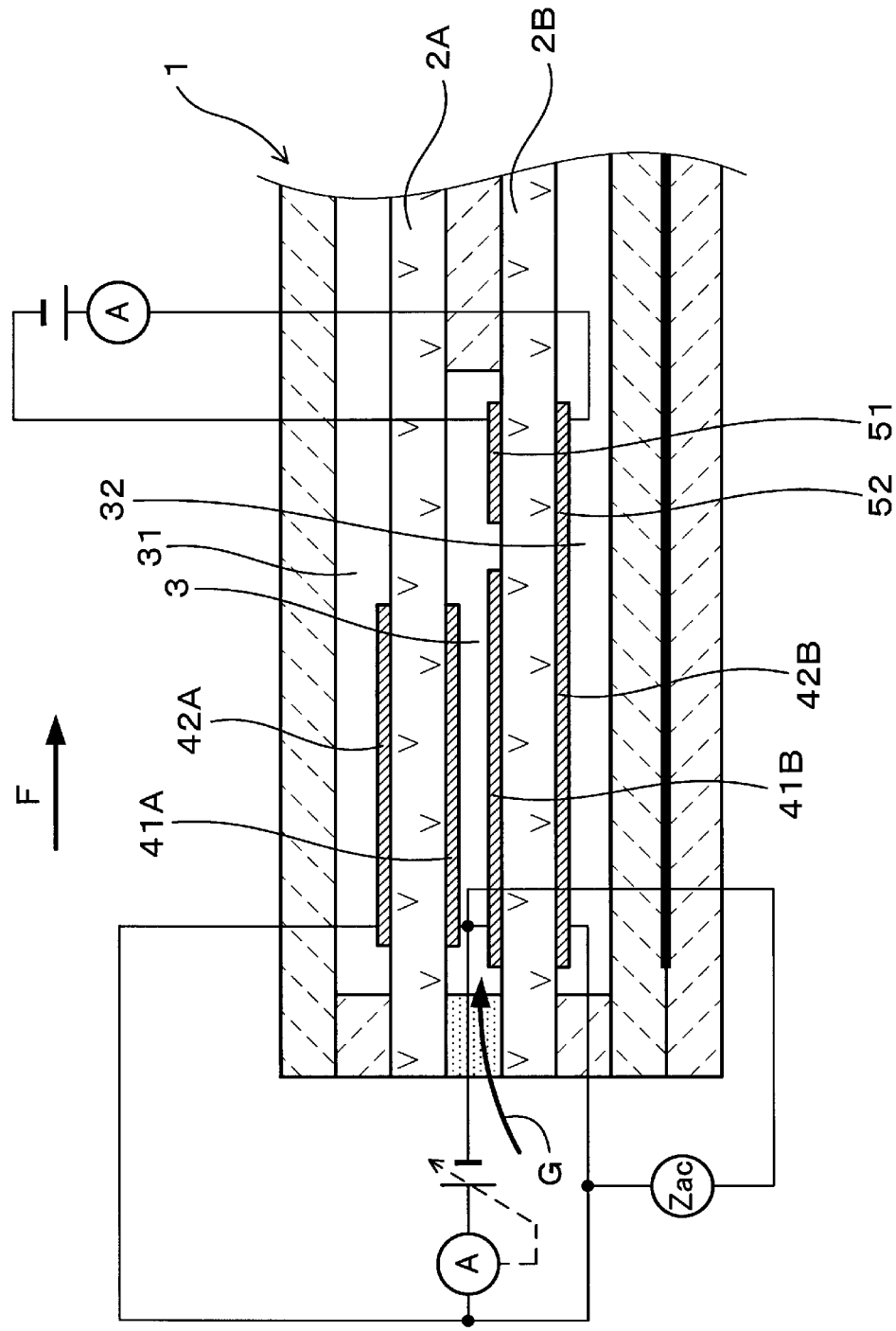
FIG. 6 is an explanatory view illustrating a cross section of another sensor element of Embodiment 1.
Figure 7:
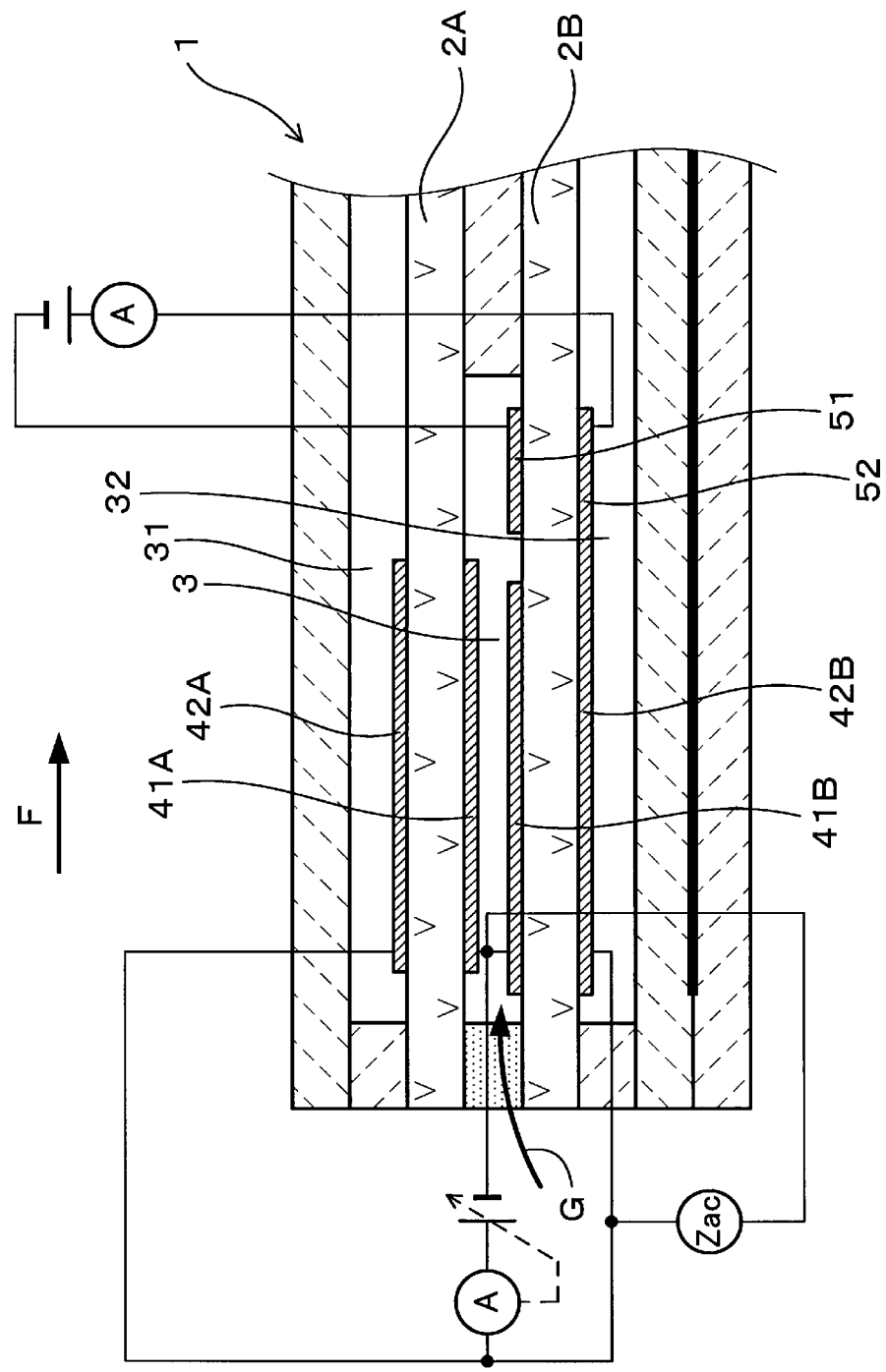
FIG. 7 is an explanatory view illustrating a cross section of another sensor element of Embodiment 1.

According to the present embodiment, the first pump electrode 41A and the second pump electrode 41B have the same size and are located at the same position in the flow direction F. Alternatively, for example, as illustrated in FIG. 6, the first pump electrode 41A and the second pump electrode 41B may be located at different positions in the flow direction F. Alternatively, for example, as illustrated in FIG. 7, the first pump electrode 41A and the second pump electrode 41B may have different sizes.

As illustrated in FIG. 1, a measurement circuit 44 which measures an impedance of the second pump cell 4B is connected between the second pump electrode 41B and the second reference electrode 42B. The measurement circuit 44 is provided in the control unit (SCU) of the gas sensor 10. A temperature of the sensor element 1 of the present embodiment is controlled by controlling a temperature of the second pump cell 4B. The SCU stores a relationship between the temperature of the second pump cell 4B and the impedance of the second pump cell 4B as a relationship map. When the measurement circuit 44 has measured the impedance of the second pump cell 4B, the impedance is checked against the relationship map, and the temperature of the second pump cell 4B is calculated on the basis of the relationship map. The relationship map is created, for example, as a relational expression of the temperature of the second pump cell 4B and the impedance of the second pump cell 4B, which is obtained by measuring changes in the impedance of the second pump cell 4B when the temperature of the second pump cell 4B is changed.

As illustrated in FIGS. 1 and 2, a first current detection circuit 53 is connected to the sensor cell 5. The first current detection circuit 53 detects an electric current flowing between the sensor electrode 51 and the third reference electrode 52 while a predetermined voltage is applied between the electrodes 51 and 52. When a specific gas component in the measurement gas G which comes into contact with the sensor electrode 51 is decomposed, oxygen ions are transmitted from the sensor electrode 51 to the third reference electrode 52 through the second solid electrolyte 2B, and an electric current generated by the oxygen ions is detected by the first current detection circuit 53.

Figure 8:
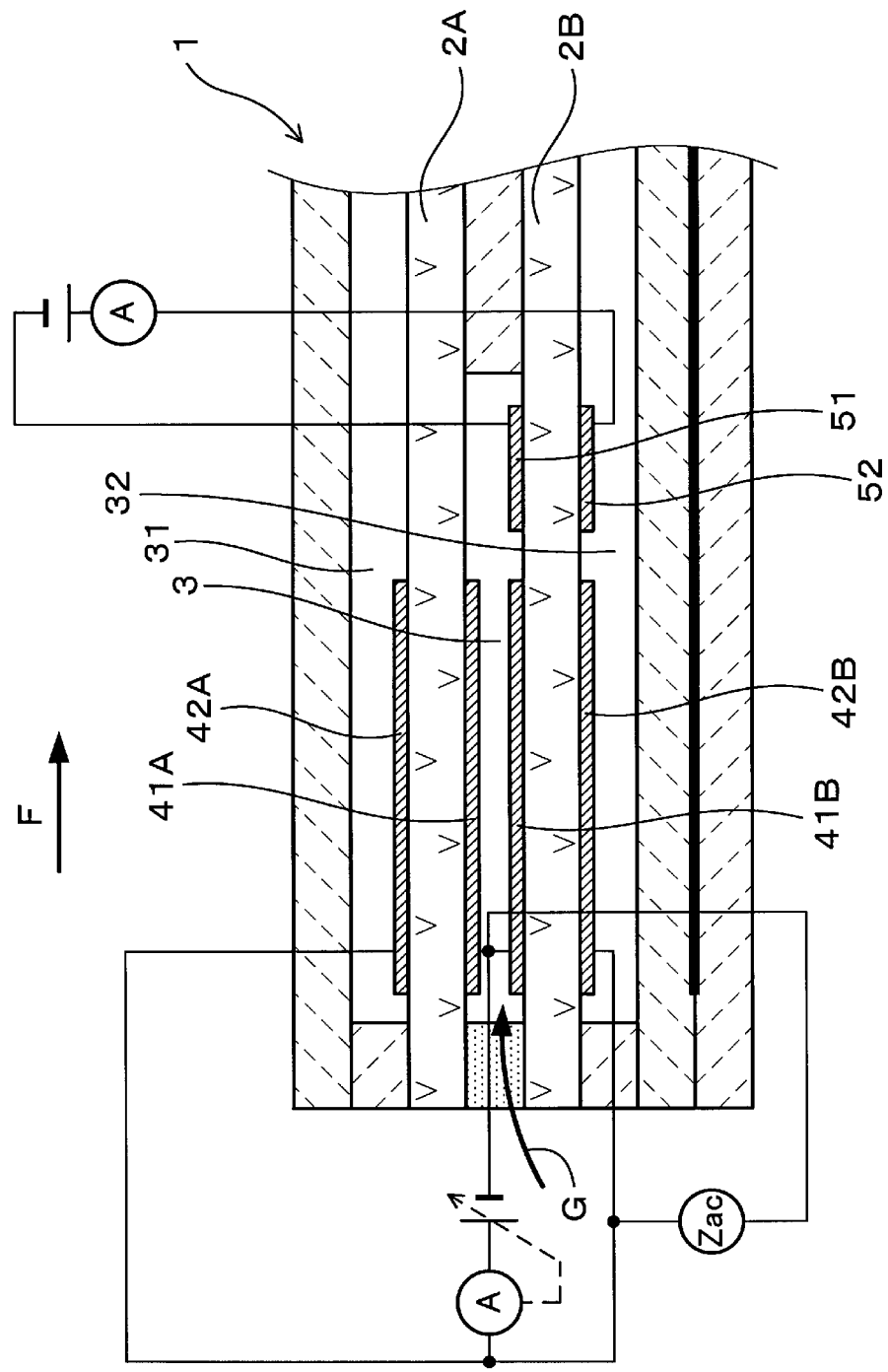
FIG. 8 is an explanatory view illustrating a cross section of another sensor element of Embodiment 1.

The third reference electrode 52 of the present embodiment is integrated with the second reference electrode 42B of the second pump cell 4B. As illustrated in FIG. 8, the third reference electrode 52 may be formed separately from the first reference electrode 42A at a position opposite to the sensor electrode 51 across the first solid electrolyte 2A.

As illustrated in FIGS. 1 and 4, the heater 6 is constituted by the heating element 61 which generates heat by energization and a ceramic substrate 62 in which the heating element 61 is embedded. When a voltage is applied to the heating element 61 of the heater 6, the heating element 61 generates heat, and the sensor element 1 is heated. When the gas sensor 10 is started, the solid electrolytes 2A and 2B, the pump cells 4A and 4B, and the sensor cell 5 are activated by heating provided by the heater 6. When the gas sensor 10 is used, the heater 6 controls the temperature of the sensor element 1. The voltage applied to the heating element 61 of the heater 6 is adjusted so that the impedance of the second pump cell 4B measured by the measurement circuit 44 has a target value and this enables the temperature of the second pump cell 4B to be maintained at a predetermined target temperature.

In the SCU, the temperature of the second pump cell 4B is controlled by receiving feedback on the impedance of the second pump cell 4B from the measurement circuit 44 and controlling the impedance of the second pump cell 4B so that the impedance has a target value. By controlling the temperature of the second pump cell 4B, a temperature of the sensor cell 5 adjacent to the second pump cell 4B on the second solid electrolyte 2B is also controlled.

Figure 9:
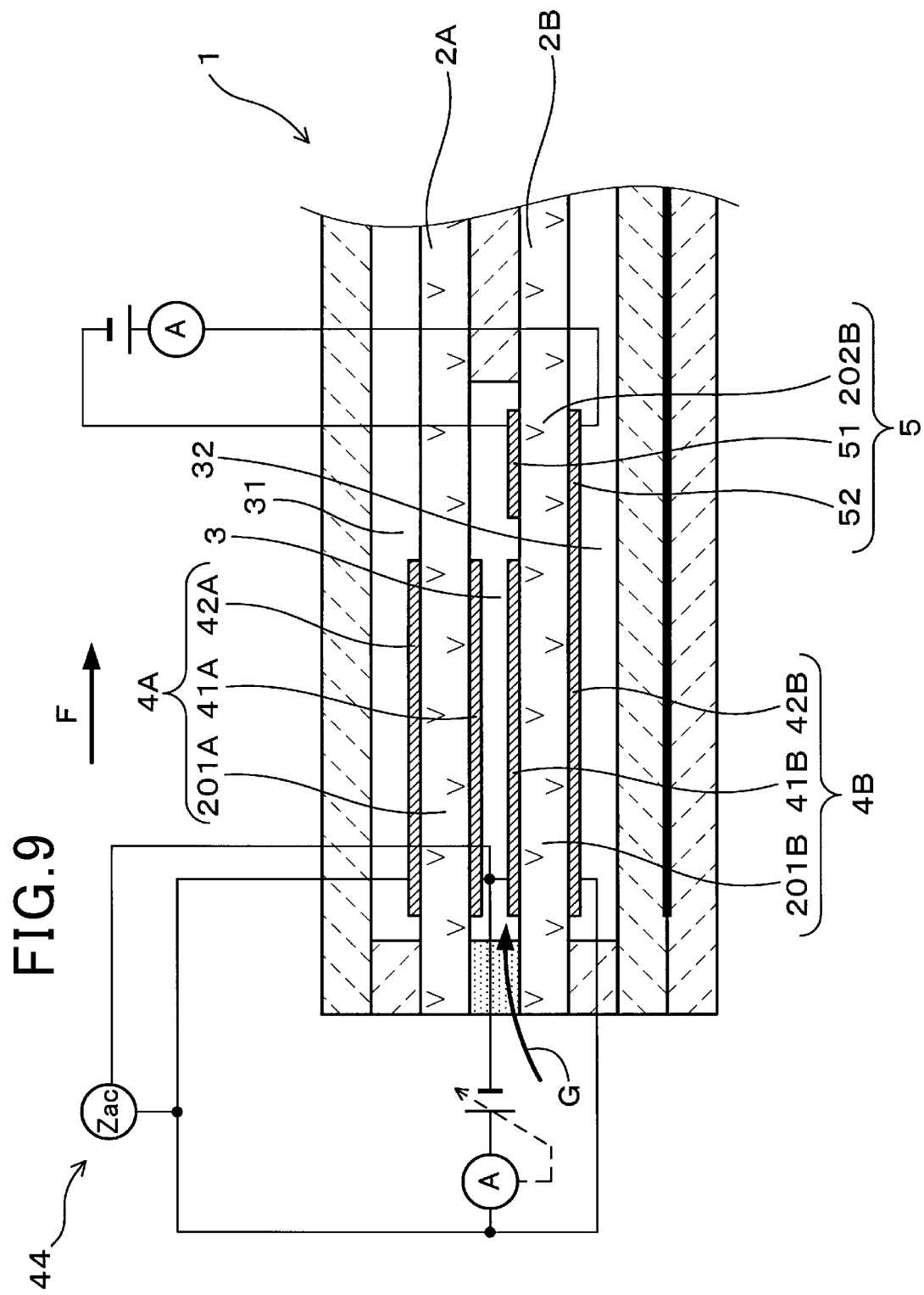
FIG. 9 is an explanatory view illustrating a cross section of another sensor element of Embodiment 1.

As illustrated in FIG. 9, the measurement circuit 44 may be connected between the first pump electrode 41A and the first reference electrode 42A to measure an impedance of the first pump cell 4A. In this case, the voltage applied to the heating element 61 of the heater 6 is adjusted so that the impedance of the first pump cell 4A measured by the measurement circuit 44 has a target value and this enables a temperature of the first pump cell 4A to be maintained at a predetermined target temperature.

Figure 3:
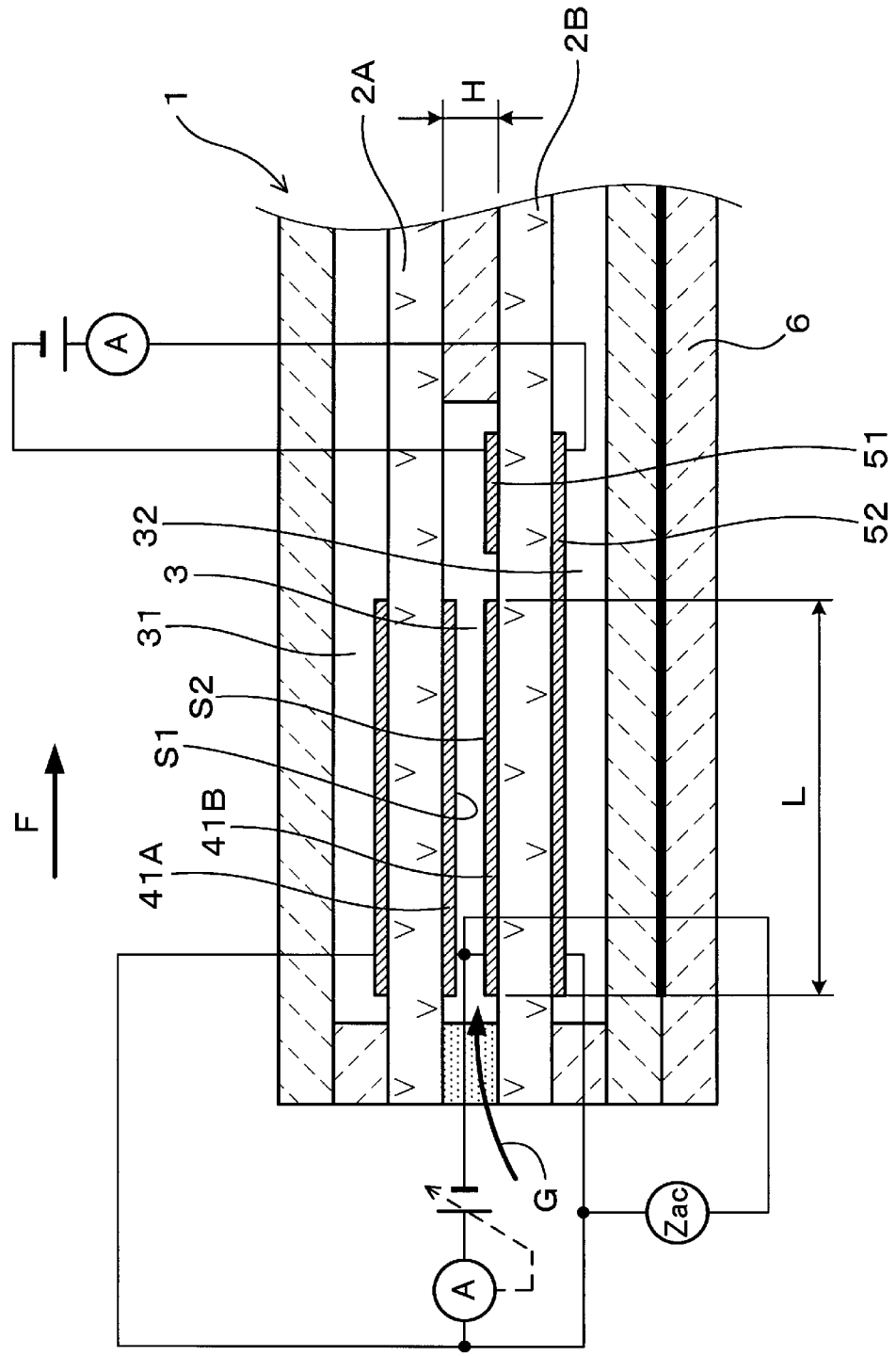
FIG. 3 is an explanatory view illustrating a cross section of the sensor element of Embodiment 1.

As illustrated in FIG. 3, in the sensor element 1 of the present embodiment, a sum of a surface area S1 of the first pump electrode 41A and a surface area S2 of the second pump electrode 41B is 10 mm$^2$ or more. The surface areas S1 and S2 indicate areas of principal surfaces, approximately parallel to the solid electrolytes 2A and 2B, of the pump electrodes 41A and 41B, respectively. The surface areas S1 and S2 do not include areas of lateral surfaces in a thickness direction of the respective pump electrodes 41A and 41B. When the sum of the surface area S1 and the surface area S2 is less than 10 mm$^2$, the pump cells 4A and 4B may fail to completely remove oxygen in the measurement gas G introduced into the measurement gas chamber 3, and this may reduce accuracy of detection of a specific gas component in the measurement gas G performed by the sensor cell 5. The sum of the surface area S1 and the surface area S2 may be 25 mm$^2$ or less, due to size constraints of the sensor element 1.

A length L of the second pump electrode 41B in the flow direction F is in the range of 2 to 5 mm. When the length L is less than 2 mm, the pump cells 4A and 4B may fail to completely remove oxygen in the measurement gas G introduced into the measurement gas chamber 3, and this may reduce accuracy of detection of a specific gas component in the measurement gas G performed by the sensor cell 5. Furthermore, when the length L exceeds 5 mm, a long time may be required for the measurement gas G in which the oxygen concentration has been adjusted by the second pump cell 4B to reach the sensor electrode 51 of the sensor cell 5, and this may reduce responsiveness in detection of a specific gas component performed by the sensor cell 5. A length L of the first pump electrode 41A in the flow direction F is also in the range of 2 to 5 mm. In the sensor element 1 of the present embodiment, the length L of the first pump electrode 41A is the same as the length L of the second pump electrode 41B.

As illustrated in FIG. 3, a height H of the measurement gas chamber 3 is in the range of 65 to 150 μm. The height H indicates a height from the second principal surface 22 of the first solid electrolyte 2A to the first principal surface 23 of the second solid electrolyte 2B. The height H does not include thicknesses of the pump electrodes 41A and 41B and the sensor electrode 51. When the height H is less than 65 μm, circulation of the measurement gas G in the measurement gas chamber 3 may be deteriorated, and this may reduce responsiveness in detection of a specific gas component performed by the sensor cell 5. Furthermore, when the height H exceeds 150 μm, a long time may be required for the measurement gas G introduced into the measurement gas chamber 3 to be replaced, and this may reduce responsiveness in detection of a specific gas component performed by the sensor cell 5.

A description will be given of functions and effects yielded by the gas sensor 10 of the present embodiment.

According to the sensor element 1 of the gas sensor 10 of the present embodiment, the heater 6 is located facing the second principal surface 24 of the second solid electrolyte 2B on which the sensor cell 5 is formed. Accordingly, as compared with when the heater 6 is located opposite to the first solid electrolyte 2A on which the sensor cell 5 is not formed, the location of the sensor cell 5 is closer to that of the heater 6, and thus when the gas sensor 10 is started or used, heat generated during operation of the heater 6 can be more quickly transferred to the sensor cell 5. This makes it easier to maintain the temperature of the sensor cell 5 in a target temperature range, even when a transient variation occurs in a surrounding temperature of the gas sensor 10. Consequently, fluctuations in the temperature of the sensor cell 5 are suppressed, and this improves accuracy of detection of a specific gas component in the measurement gas G performed by the sensor cell 5.

Since the pump cells 4A and 4B are separated as the respective first pump cell 4A and second pump cell 4B, the length of each of the pump cells 4A and 4B in the flow direction F is short. Accordingly, only a short time is required for the measurement gas G in which the oxygen concentration has been adjusted by the pump cells 4A and 4B to reach the sensor electrode 51 of the sensor cell 5. Thus, high responsiveness is maintained in detection of a concentration of specific gas in the measurement gas G.

The voltage applied to the heater 6 is controlled by using the impedance of the second pump cell 4B provided on the second solid electrolyte 2B, which is located closer to the heater 6. Furthermore, the voltage applied to the heater 6 is controlled by using the impedance of the second pump cell 4B provided on the second solid electrolyte 2B on which the sensor cell 5 is also provided. Since a distance between the heater 6 and the second solid electrolyte 2B is smaller than a distance between the heater 6 and the first solid electrolyte 2A, heat is more effectively transferred from the heater 6 to the second pump cell 4B than to the first pump cell 4A. Accordingly, heat generated by the heater 6 is more easily transferred to the second pump cell 4B, and in response to the heat generation of the heater 6, the impedance of the second pump cell 4B quickly changes. This improves responsiveness in control of the temperature of the second pump cell 4B.

Thus, even when a transient variation occurs in a surrounding temperature of the sensor element 1, it is possible to reduce electric power applied to the heater 6 which is required for maintaining the temperatures of the second pump cell 4B and the sensor cell 5 in a target temperature range. Consequently, electric power consumption of the gas sensor 10 can be reduced.

As has been described, the gas sensor 10 improves accuracy of detection of a specific gas component in measurement gas and reduces electric power consumption of the gas sensor 10, while maintaining high responsiveness in detection of the specific gas component.

Embodiment 2

Figure 10:
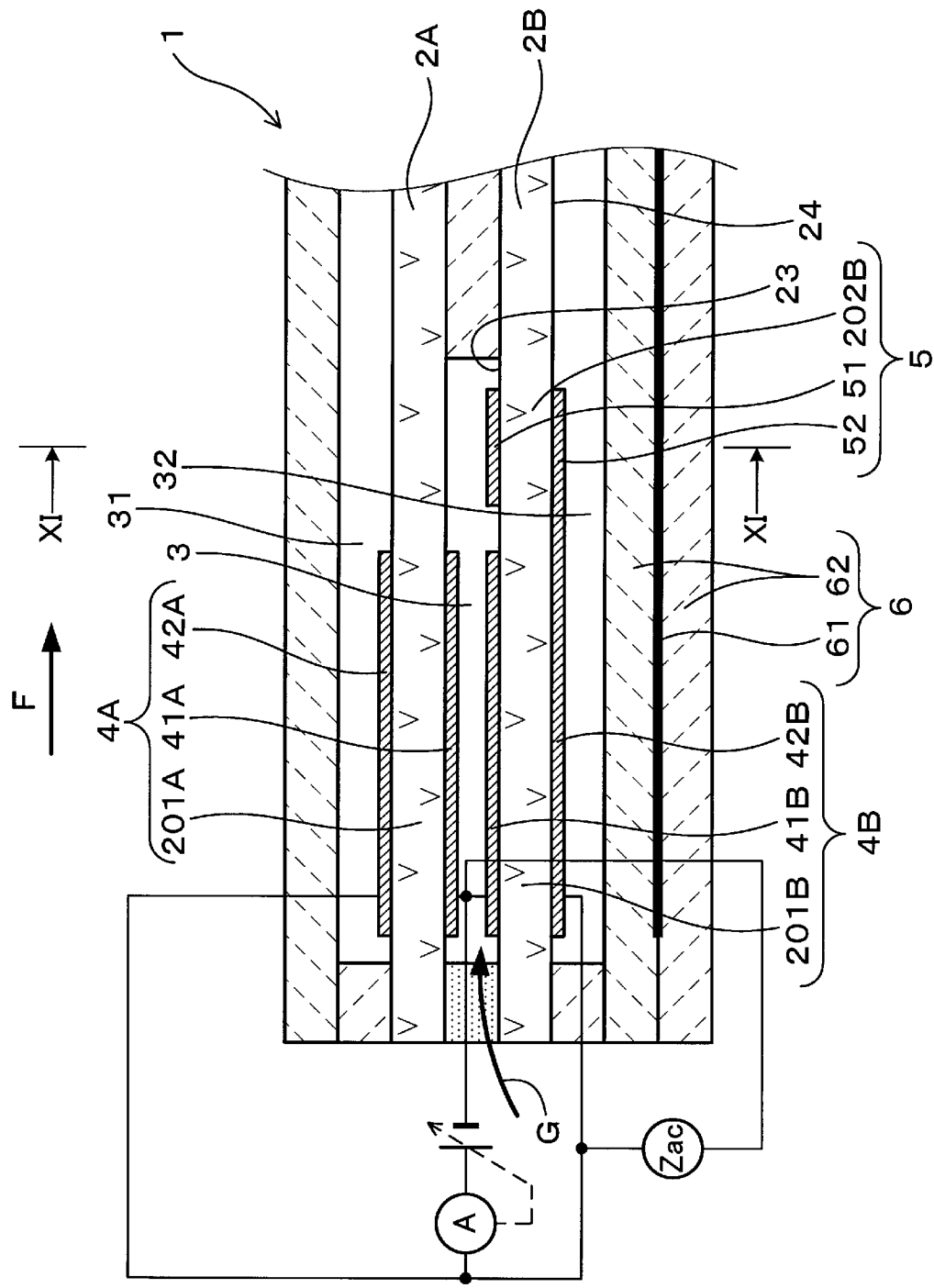
FIG. 10 is an explanatory view illustrating a cross section of a sensor element of Embodiment 2.
Figure 11:
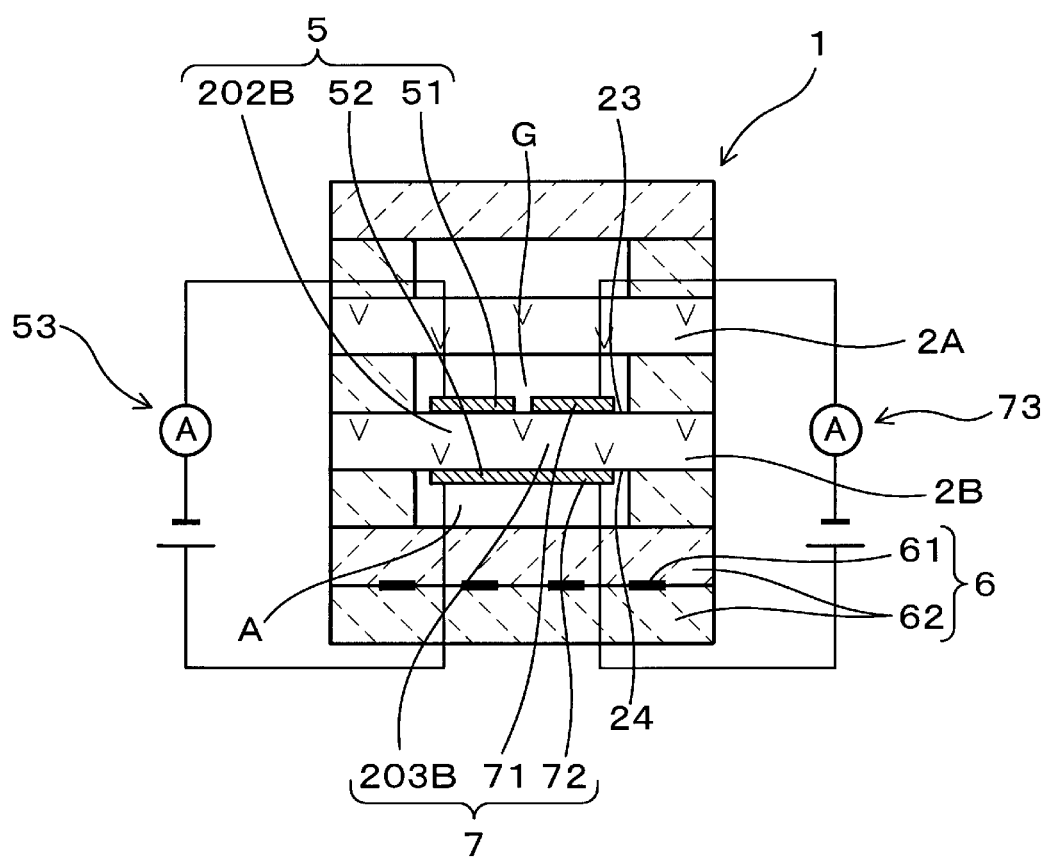
FIG. 11 is a cross-sectional view taken along line XI-XI viewed from the direction of arrows in FIG. 10.

As illustrated in FIGS. 10 and 11, the sensor element 1 of the gas sensor 10 of the present embodiment further includes a monitor cell 7 adjacent to the sensor cell 5. The monitor cell 7 is constituted by a monitor electrode 71 which is formed on the first principal surface 23 of the second solid electrolyte 2B and is exposed to the measurement gas G in the measurement gas chamber 3, a fourth reference electrode 72 which is formed on the second principal surface 24 of the second solid electrolyte 2B and is exposed to the reference gas A, and a part 203B of the second solid electrolyte 2B interposed between the monitor electrode 71 and the fourth reference electrode 72. The monitor electrode 71 is located adjacent to the sensor electrode 51 in a direction orthogonal to the flow direction F on the first principal surface 23 of the second solid electrolyte 2B.

The monitor cell 7 is used for detecting, on the basis of an electric current flowing between the fourth reference electrode 72 and the monitor electrode 71, residual oxygen in the measurement gas G in which the oxygen concentration has been adjusted by the pump cells 4A and 4B. The sensor cell 5 of the present embodiment is used for detecting specific gas and residual oxygen in the measurement gas G in which the oxygen concentration has been adjusted by the pump cells 4A and 4B.

As illustrated in FIGS. 10 and 11, the monitor electrode 71 is located in the measurement gas chamber 3, and the fourth reference electrode 72 is located in the second reference gas chamber 32. The pump electrodes 41A and 41B and the monitor electrode 71 are composed of a cermet material containing a zirconia component and a noble metal component, such as Pt or Pt—Au alloy, which is capable of decomposing oxygen but not decomposing a specific gas component in the measurement gas G. Furthermore, the sensor electrode 51 is composed of a cermet material containing a zirconia component and a noble metal component, such as Pt—Rh alloy, which is capable of decomposing oxygen and specific gas.

The reference electrodes 42A, 42B, 52, and 72 are composed of a cermet material containing a zirconia component and a noble metal component, such as Pt, which is capable of decomposing oxygen. The noble metal component of the monitor electrode 71 is the same as that of the first pump electrode 41A and the second pump electrode 41B. This enables catalytic activity of the monitor electrode 71 with respect to oxygen to be equivalent to catalytic activity of the pump electrodes 41A and 41B with respect to oxygen.

As illustrated in FIG. 11, a second current detection circuit 73 is connected to the monitor cell 7. The second current detection circuit 73 detects an electric current flowing between the monitor electrode 71 and the fourth reference electrode 72 while a predetermined voltage is applied between the electrodes 71 and 72. When residual oxygen which comes into contact with the monitor electrode 71 is decomposed, oxygen ions are transmitted from the monitor electrode 71 to the fourth reference electrode 72 through the second solid electrolyte 2B, and an electric current generated by the oxygen ions is detected by the second current detection circuit 73.

The fourth reference electrode 72 of the present embodiment is integrated with the second reference electrode 42B of the second pump cell 4B and the third reference electrode 52 of the sensor cell 5. The fourth reference electrode 72 may be formed separately from the second reference electrode 42B and the third reference electrode 52 at a position opposite to the monitor electrode 71 across the second solid electrolyte 2B.

Other configurations are similar to those of Embodiment 1. Among reference signs used in Embodiment 2 and subsequent descriptions, the same reference signs as those used in the previously mentioned embodiments indicate components or the like similar to those of the previously mentioned embodiments, unless otherwise stated.

According to the gas sensor 10 of the present embodiment, an output of the monitor cell 7 is subtracted from an output of the sensor cell 5, and the output obtained by the subtraction is a sensor output of the gas sensor 10. This enables the sensor output of the gas sensor 10 to be less influenced by electronic conduction caused by the residual oxygen in the measurement gas G and the heat generation of the heater 6. Thus, the gas sensor 10 of the present embodiment further improves accuracy of detection of a specific gas component in the measurement gas G.

Furthermore, the gas sensor 10 of the present embodiment yields effects similar to those of Embodiment 1.

(Check Test 1)

In Check Test 1, samples of the sensor element 1 (Test Item 1) of Embodiment 1, the sensor element 1 (Test Item 2) of Embodiment 2, and a conventional sensor element 9 (Comparison Item 1) were prepared, and in gas sensors employing the respective samples, changes in sensor output were measured when composition of the measurement gas G was changed.

Figure 19:
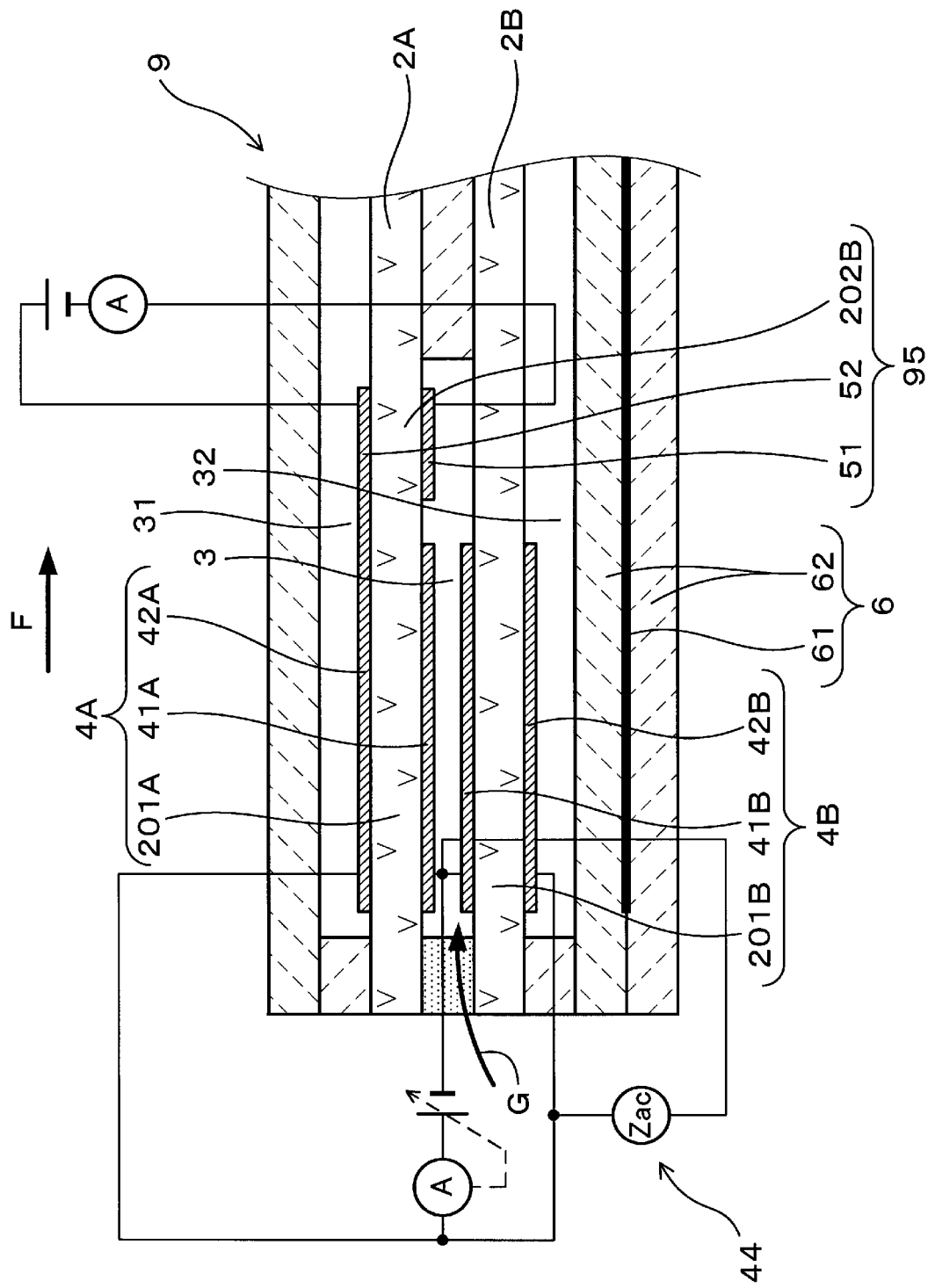
FIG. 19 is an explanatory view illustrating a cross section of a sensor element of Comparison Item 1.

FIG. 19 illustrates the sensor element 9 of Comparison Item 1. In the sensor element 9 of Comparison Item 1, as illustrated in FIG. 19, a sensor cell 95 is provided on the first solid electrolyte 2A, which is located away from the heater 6. In the sensor element 9, the measurement circuit 44 is connected between the second pump electrode 41B and the second reference electrode 42B. The lengths of the pump electrodes 41A and 41B in the samples were all fixed at 3.0 mm.

Figure 12:
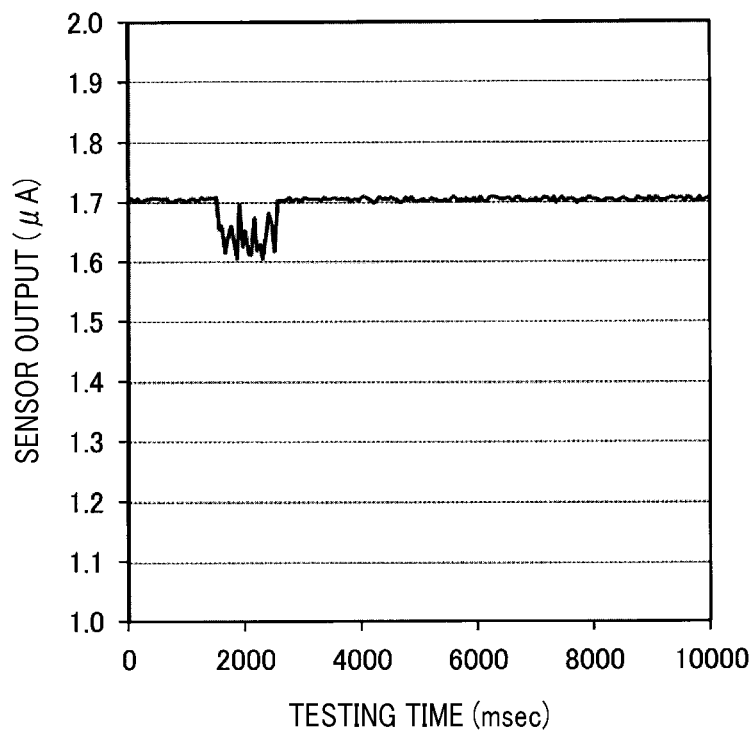
FIG. 12 is a graph showing a relationship between a testing time and a sensor output for Test Item 1 in Check Test 1.
Figure 13:
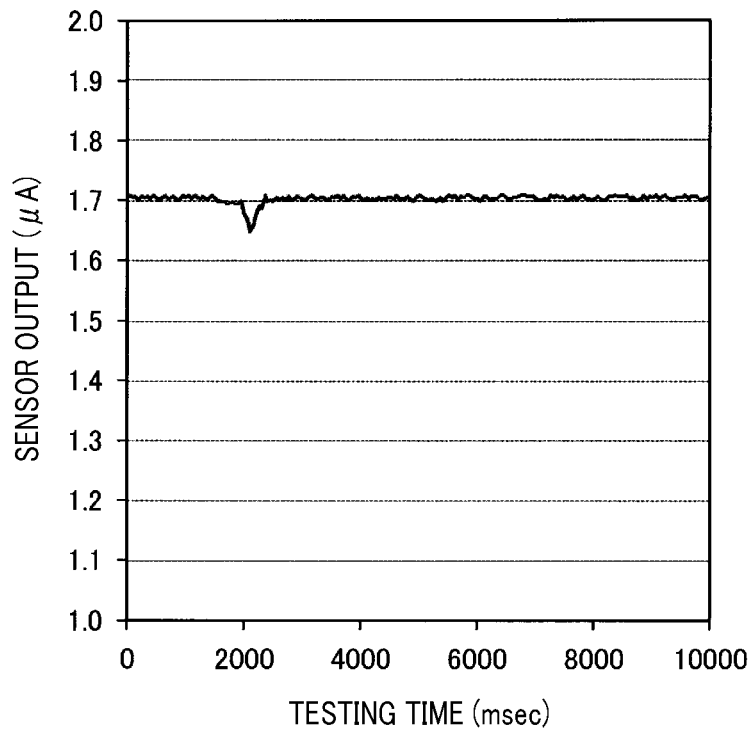
FIG. 13 is a graph showing a relationship between a testing time and a sensor output for Test Item 2 in Check Test 1.
Figure 14:
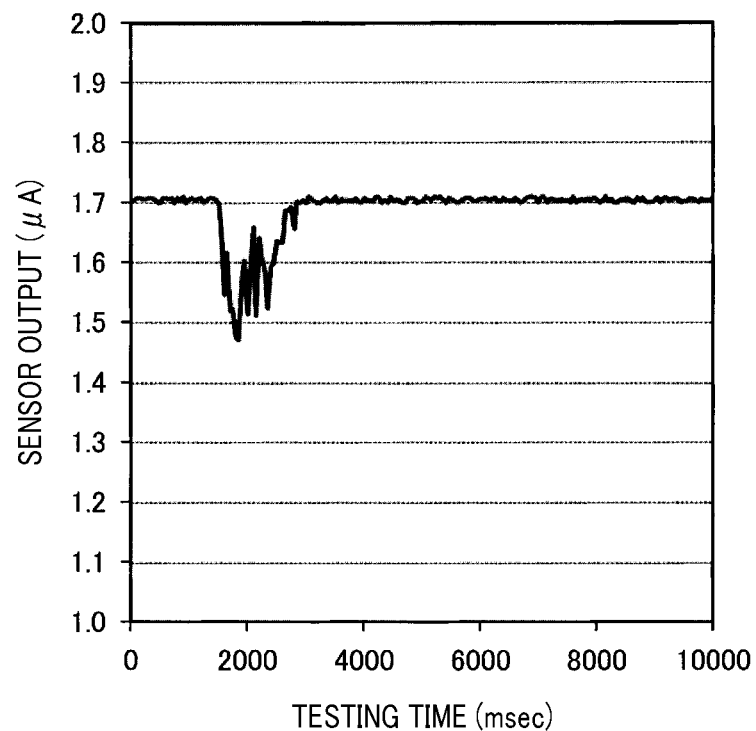
FIG. 14 is a graph showing a relationship between a testing time and a sensor output for Comparison Item 1 in Check Test 1.

In Check Test 1, first, the sensor cell 5 in the samples of Test Item 1 and Test Item 2 and the sensor cell 95 in the sample of Comparison Item 1 were heated by the heater 6 in the samples until a temperature of the sensor cells 5 and 95 in the samples reached 750° C. After the temperature of the sensor cells 5 and 95 in the samples was stabilized, measurement gas G in which an oxygen concentration was 21%, a nitric oxide concentration was 400 ppm, and the remainder was nitrogen was supplied to the measurement gas chamber 3 in the samples. Until 1500 msec elapsed after the measurement gas G was supplied, the temperature of the measurement gas G was set to 500° C., and after 1500 msec elapsed, the temperature of the measurement gas G was changed to 0° C. FIGS. 12 to 14 show fluctuations in sensor output of Test Item 1, Test Item 2, and Comparison Item 1 in Check Test 1, respectively.

As shown in FIG. 12, a range of fluctuation of the sensor output in the sample of Test Item 1 was approximately 0.1 µA, and as shown in FIG. 14, a range of fluctuation of the sensor output in the sample of Comparison Item 1 was approximately 0.2 µA. A fluctuation time of the sensor output in the sample of Test Item 1 was shorter than that of the sensor output in the sample of Comparison Item 1. This showed that the sensor output of Test Item 1 was less influenced by the change in temperature of the measurement gas G than the sensor output of Comparison Item 1. Furthermore, it was found that providing the sensor cell 5 on the second solid electrolyte 2B, which was closer to the location of the heater 6, had an advantage in accuracy of the detection over providing the sensor cell 5 on the first solid electrolyte 2A, which was farther from the location of the heater 6. This showed that, in order to improve accuracy of the detection performed by the gas sensor 10, the location of the sensor cell 5 is preferably closer to the location of the heater 6.

Furthermore, as shown in FIG. 13, a range of fluctuation of the sensor output in the sample of Test Item 2 was approximately 0.05 µA. A fluctuation time of the sensor output in the sample of Test Item 2 was shorter than that of the sensor output in the sample of Test Item 1. This showed that the sensor output of Test Item 2 was even less influenced by the change in temperature of the measurement gas G than the sensor output of Test Item 1. This is presumably because, by subtracting the output of the monitor cell 7 from the sensor output, the sensor output was less influenced by electronic conduction caused by residual oxygen in the measurement gas G and heat generation of the heater 6. This showed that, in order to further improve accuracy of the detection performed by the gas sensor 10, it is preferable to provide the monitor cell 7 adjacent to the sensor cell 5.

(Check Test 2)

In Check Test 2, samples of the sensor element 1 (Test Item 1) in FIG. 1 of Embodiment 1, in which the impedance of the second pump cell 4B was measured by the measurement circuit 44, and the sensor element 1 (Test Item 3) in FIG. 9 of Embodiment 1, in which the impedance of the first pump cell 4A was measured by the measurement circuit 44, were prepared. Furthermore, samples of the conventional sensor element 9 (Comparison Item 1) in FIG. 19, in which the impedance of the second pump cell 4B was measured by the measurement circuit 44, and the conventional sensor element 9 (Comparison Item 2) in FIG. 20, in which the impedance of the first pump cell 4A was measured by the measurement circuit 44, were prepared.

In each of the samples, electric power applied to the heater 6 was measured, and a ratio of applied electric power was calculated. The ratio of applied electric power indicates the ratio of the applied electric power in each of Test Item 3, Comparison Item 1, and Comparison Item 2 to a reference value, when the applied electric power in Test Item 1 is 1.00 (100% in terms of percentage), which is the reference value.

Figure 20:
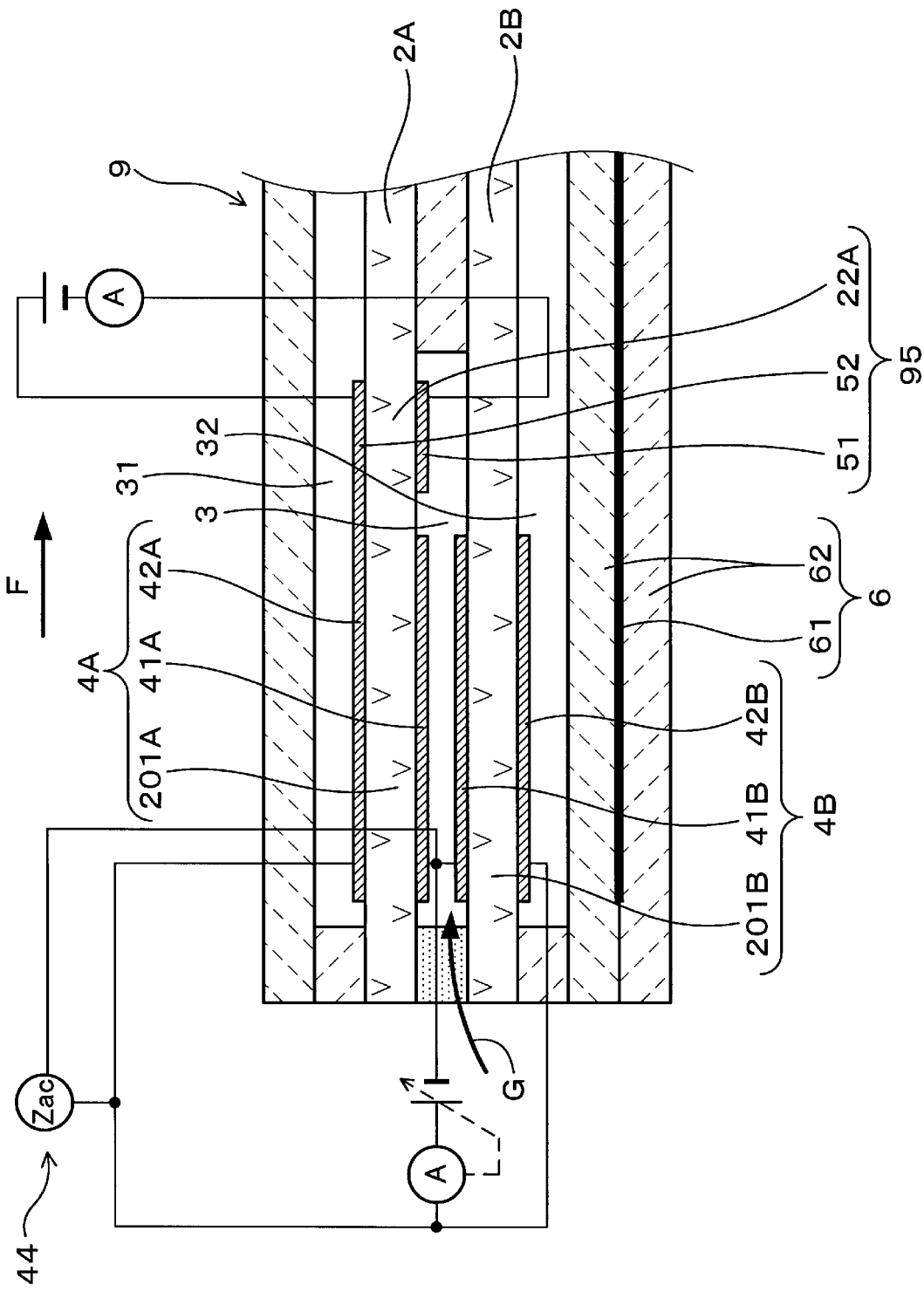
FIG. 20 is an explanatory view illustrating a cross section of a sensor element of Comparison Item 2.

FIG. 20 illustrates the sensor element 9 of Comparison Item 2. In the sensor element 9 of Comparison Item 2, as illustrated in FIG. 20, the sensor cell 95 is provided on the first solid electrolyte 2A, which is located away from the heater 6. In the sensor element 9, the measurement circuit 44 is connected between the first pump electrode 41A and the first reference electrode 42A. The lengths of the pump electrodes 41A and 41B in the samples were all fixed at 3.0 mm.

Figure 15:
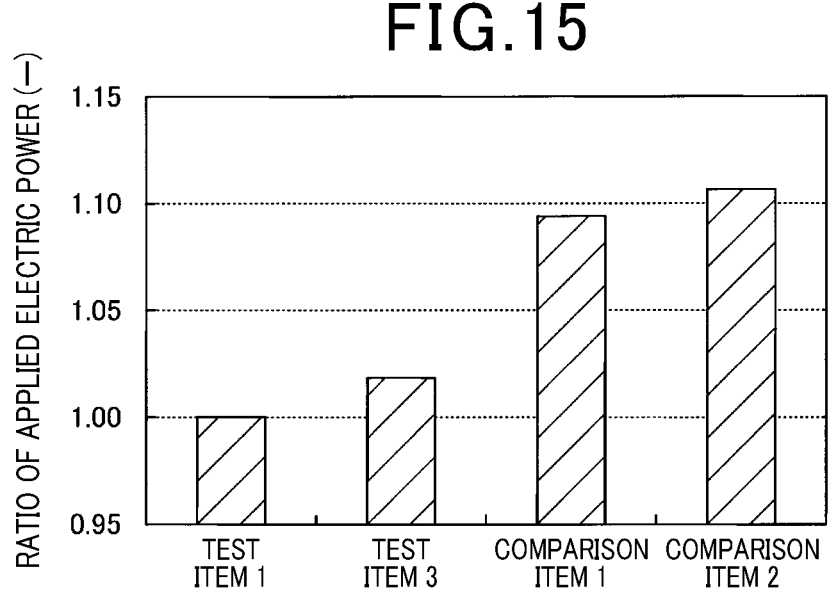
FIG. 15 is a graph showing a relationship between ratios of applied electric power for Test Item 1, Test Item 3, Comparison Item 1, and Comparison Item 2 in Check Test 2.

In Check Test 2, the sensor cell 5 in the samples of Test Item 1 and Test Item 3 and the sensor cell 95 in the samples of Comparison Item 1 and Comparison Item 2 were heated by the heater 6 in the samples until a temperature of the sensor cells 5 and 95 in the samples reached 750° C. FIG. 15 shows the ratio of applied electric power in Test Item 1, Test Item 3, Comparison Item 1, and Comparison Item 2 in Check Test 2.

As shown in FIG. 15, the applied electric power in Test Item 1 was smaller than that in Comparison Item 1. Furthermore, the applied electric power in Test Item 3 was smaller than that in Comparison Item 2. This is presumably because, by providing the sensor cell 5 on the second solid electrolyte 2B, which was located closer to the heater 6, the sensor cell 5 was able to be quickly heated to a target temperature of 750° C. This result showed that providing the sensor cell 5 on the second solid electrolyte 2B, which was closer to the location of the heater 6, had an advantage in electric power applied to the heater 6 over providing the sensor cell 5 on the first solid electrolyte 2A, which was farther from the location of the heater 6.

The applied electric power in Test Item 1 was smaller than that in Test Item 3. Furthermore, the applied electric power in Comparison Item 1 was smaller than that in Comparison Item 2. This is presumably because, by controlling heating provided by the heater 6 using the impedance of the second pump cell 4B, which was located close to the heater 6, the sensor cell 5 was able to be quickly heated to a target temperature of 750° C. This result showed that the measurement circuit 44 which measured the impedance of the second pump cell 4B, which was located close to the heater 6, had an advantage in electric power applied to the heater 6 over the measurement circuit 44 which measured the impedance of the first pump cell 4A, which was located away from the heater 6.

(Check Test 3)

In Check Test 3, with regard to the sensor element 1 in FIG. 1 of Embodiment 1, changes in sensor output were measured in samples which varied in pump electrode total area of the sensor element 1. The pump electrode total area is the sum of the surface areas S1 and S2 of the respective pump electrodes 41A and 41B.

Figure 16:
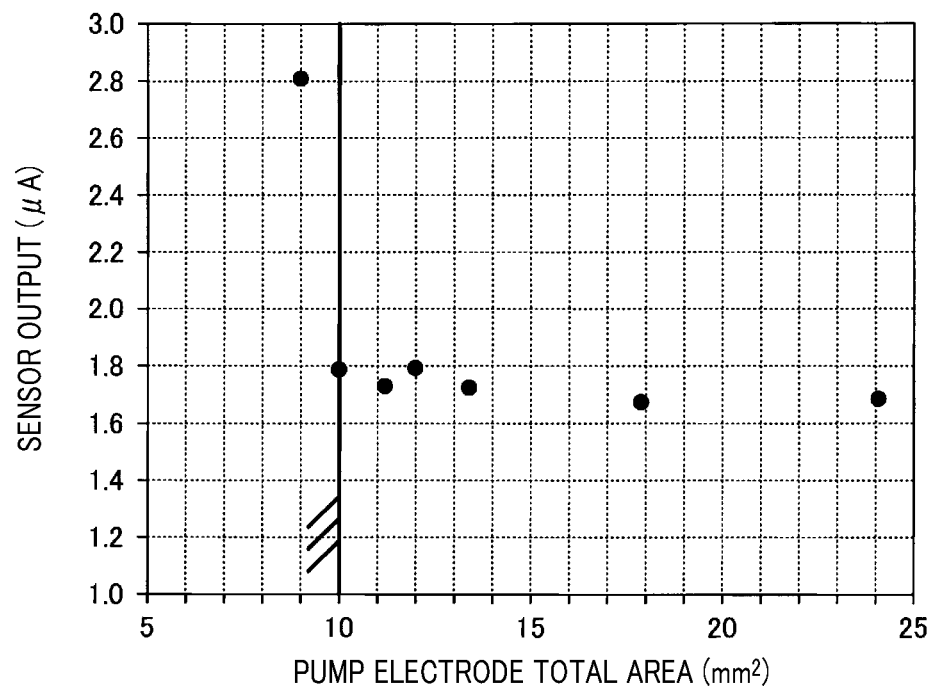
FIG. 16 is a graph showing a relationship between a pump electrode total area and a sensor output in Check Test 3.

In Check Test 3, first, the sensor cell 5 in the samples was heated by the heater 6 in the samples until a temperature of the sensor cell 5 in the samples reached 750° C. After the temperature of the sensor cell 5 in the samples was stabilized, measurement gas G in which an oxygen concentration was 21%, a nitric oxide concentration was 400 ppm, and the remainder was nitrogen was supplied to the measurement gas chamber 3 in the samples. FIG. 16 shows the sensor output in the samples in Check Test 3.

As shown in FIG. 16, when the pump electrode total area was 10 mm² or more, the sensor output in the samples was stabilized in the range of 1.6 to 1.8 µA. However, when the pump electrode total area was less than 10 mm², the sensor output in the samples increased by approximately 1 µA. This is presumably because, due to the insufficient surface areas S1 and S2 of the respective pump electrodes 41A and 41B, oxygen in the measurement gas G introduced into the measurement gas chamber 3 was not completely removed, and thus residual oxygen was detected in the sensor cell 5. This showed that, in order to improve accuracy of the detection performed by the gas sensor 10, the pump electrode total area is preferably 10 mm² or more.

(Check Test 4)

In Check Test 4, with regard to the sensor element 1 in FIG. 1 of Embodiment 1, a response time was measured in samples which varied in the length L of the second pump electrode 41B of the sensor element 1. The response time was a 63% response time in which the sensor output changed from a final output of 10% to 63%. The response time within 1000 msec ensures responsiveness of the gas sensor 10. The height H of the measurement gas chamber 3 in the samples was fixed at 100 μm.

Figure 17:
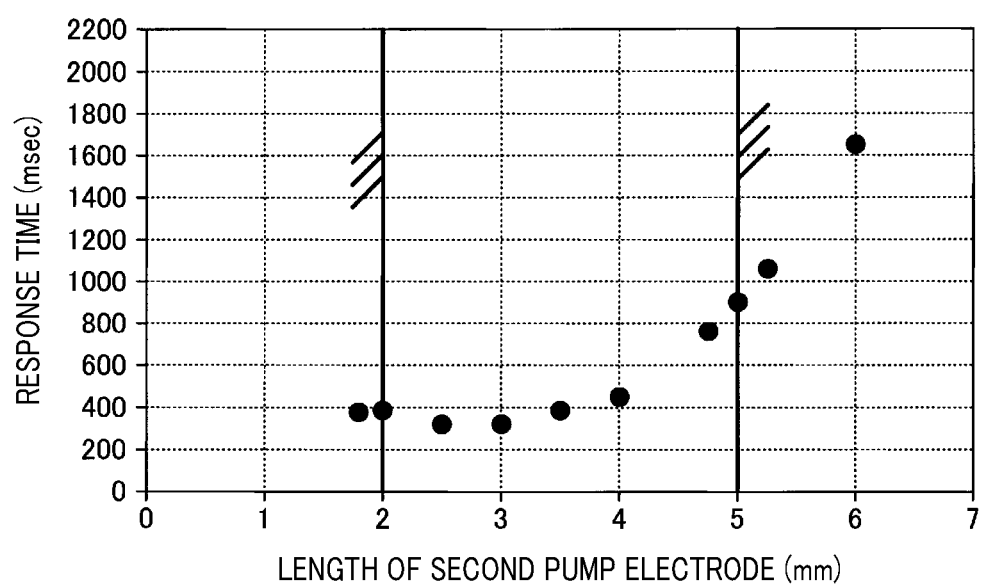
FIG. 17 is a graph showing a relationship between a length of a second pump electrode and a response time in Check Test 4.

In Check Test 4, first, the sensor cell 5 in the samples was heated by the heater 6 in the samples until a temperature of the sensor cell 5 in the samples reached 750° C. After the temperature of the sensor cell 5 in the samples was stabilized, measurement gas G in which a nitric oxide concentration was 50 ppm and the remainder was nitrogen was supplied to the measurement gas chamber 3 in the samples at a flow rate of 20 msec. After the sensor output in the samples was stabilized, the nitric oxide concentration was changed to 300 ppm. FIG. 17 shows the response time in the samples in Check Test 4.

As shown in FIG. 17, when the length L of the second pump electrode 41B was 5 mm or less, the response time in the samples was not more than 1000 msec, which was a reference value. However, when the length L of the second pump electrode 41B exceeded 5 mm, the response time in the samples exceeded 1000 msec, which was the reference value. This is presumably because when the length L of the second pump electrode 41B was large, a long time was required for the measurement gas G to reach the sensor electrode 51 of the sensor cell 5.

Furthermore, when the length L of the second pump electrode 41B was less than 2 mm, oxygen in the measurement gas G introduced into the measurement gas chamber 3 may have become difficult to be removed, and this may have made it difficult to measure specific gas by the gas sensor 10. This showed that, in order to maintain responsiveness of the gas sensor 10, the length L of the second pump electrode 41B is preferably 2 mm or more and 5 mm or less.

(Check Test 5)

Figure 18:
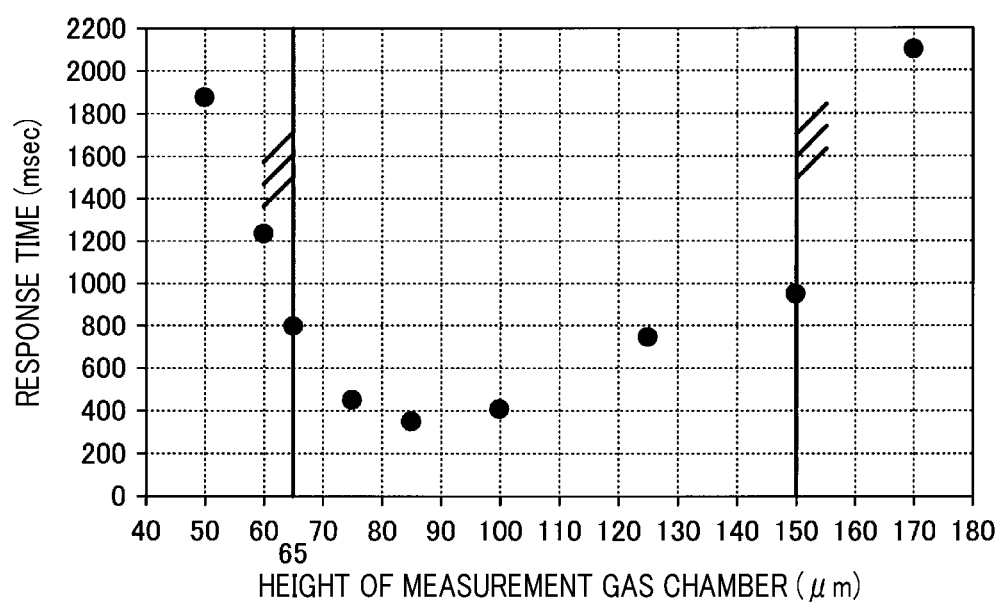
FIG. 18 is a graph showing a relationship between a height of a measurement gas chamber and a response time in Check Test 5.

In Check Test 5, with regard to the sensor element 1 in FIG. 1 of Embodiment 1, a response time was measured in samples which varied in the height H of the measurement gas chamber 3 of the sensor element 1. As with Check Test 4, the response time within 1000 msec ensures responsiveness of the gas sensor 10. The length L of the second pump electrodes 41B in the samples was fixed at 3.5 mm. Also in Check Test 5, the measurement gas G was supplied to the measurement gas chamber 3 in a similar manner to Check Test 4. FIG. 18 shows the response time in the samples when the nitric oxide concentration was changed.

As shown in FIG. 18, when the height H of the measurement gas chamber 3 was 65 μm or more and 150 μm or less, the response time in the samples was not more than 1000 msec, which was a reference value. However, when the height H of the measurement gas chamber 3 was less than 65 μm, the response time in the samples exceeded 1000 msec, which was the reference value. This is presumably because when the height H of the measurement gas chamber 3 was less than 65 μm, circulation of the measurement gas G in the measurement gas chamber 3 was deteriorated.

Furthermore, when the height H of the measurement gas chamber 3 exceeded 150 μm, the response time in the samples also exceeded 1000 msec, which was the reference value. This is presumably because when the height H of the measurement gas chamber 3 exceeded 150 μm, a long time was required for the measurement gas G introduced into the measurement gas chamber 3 to be replaced. This showed that, in order to maintain responsiveness of the gas sensor 10, the height H of the measurement gas chamber 3 is preferably 65 μm or more and 150 μm or less.

The present disclosure is described on the basis of the embodiments, but the present disclosure is considered not to be limited to the embodiments or the configurations. The present disclosure encompasses various modified examples and variations in an equivalent range. In addition, a category or conceptual range of the present disclosure encompasses various combinations or forms and other combinations or forms including only one element, one or more elements, or one or less elements of those.

What is claimed is:

1. A gas sensor comprising a sensor element for measuring a concentration of a specific gas component in measurement gas containing oxygen, wherein the sensor element includes:
a measurement gas chamber into which the measurement gas is introduced;
a first reference gas chamber and a second reference gas chamber into each of which reference gas is introduced;
a first solid electrolyte which has a plate shape, has oxygen ionic conductivity, is located between the first reference gas chamber and the measurement gas chamber, and has a first principal surface facing the first reference gas chamber and a second principal surface facing the measurement gas chamber;
a second solid electrolyte which has oxygen ionic conductivity, is located opposite to the first solid electrolyte across the measurement gas chamber, is located between the second reference gas chamber and the measurement gas chamber, and has a first principal surface facing the measurement gas chamber and a second principal surface facing the second reference gas chamber;
a first pump cell which is constituted by a first reference electrode, a first pump electrode, and a part of the first solid electrolyte and adjusts an oxygen concentration in the measurement gas chamber by energization between the first reference electrode and the first pump electrode, the first reference electrode being formed on the first principal surface of the first solid electrolyte, the first pump electrode being formed on the second principal surface of the first solid electrolyte, the part of the first solid electrolyte being interposed between the first reference electrode and the first pump electrode;
a second pump cell which is constituted by a second pump electrode; a second reference electrode, and a part of the second solid electrolyte and adjusts the oxygen concentration in the measurement gas chamber by energization between the second reference electrode and the second pump electrode, the second pump electrode being formed on the first principal surface of the second solid electrolyte, the second reference electrode being formed on the second principal surface of the second solid electrolyte, the part of the second solid electrolyte being interposed between the second pump electrode and the second reference electrode;
a sensor cell which is constituted by a sensor electrode, a third reference electrode, and a part of the second solid electrolyte and is for detecting, on a basis of an electric current flowing between the third reference electrode and the sensor electrode, a specific gas component in the measurement gas in which the oxygen concentration has been adjusted by the pump cells, the sensor electrode being formed downstream from the second pump cell in a flow direction of the measurement gas on the first principal surface of the second solid electrolyte, the third reference electrode being formed on the second principal surface of the second solid electrolyte, the part of the second solid electrolyte being interposed between the sensor electrode and the third reference electrode; and a heater which is located facing the second principal surface of the second solid electrolyte; wherein:

a sum of a surface area of the first pump electrode and a surface area of the second pump electrode is 10 mm$^2$ or more and 25 mm$^2$ or less; and a voltage applied to the heater is adjusted so that an impedance of the second pump cell has a target value.

2. The gas sensor as set forth in claim 1, wherein
the sensor element further includes a monitor cell; and
the monitor cell is constituted by a monitor electrode, a fourth reference electrode, and a part of the second solid electrolyte and detects, on a basis of an electric current flowing between the fourth reference electrode and the monitor electrode, residual oxygen in the measurement gas in which the oxygen concentration has been adjusted by the pump cells, the monitor electrode being formed adjacent to the sensor electrode in a direction orthogonal to the flow direction on the first principal surface of the second solid electrolyte, the fourth reference electrode being formed on the second principal surface of the second solid electrolyte, the part of the second solid electrolyte being interposed between the monitor electrode and the fourth reference electrode.

3. The gas sensor as set forth in claim 2, wherein
a noble metal component of the monitor electrode is the same as a noble metal component of each of the first pump electrode and the second pump electrode.

4. The gas sensor as set forth in claim 1, wherein
a length of the second pump electrode in the flow direction is in the range of 2 to 5 mm.

5. The gas sensor as set forth in claim 1, wherein
a height of the measurement gas chamber is in the range of 65 to 150 µm.

* * * * *